L. J. GARDNER.
SHUTTER BOWER.
APPLICATION FILED OCT. 27, 1908.
929,082.
Patented July 27, 1909.
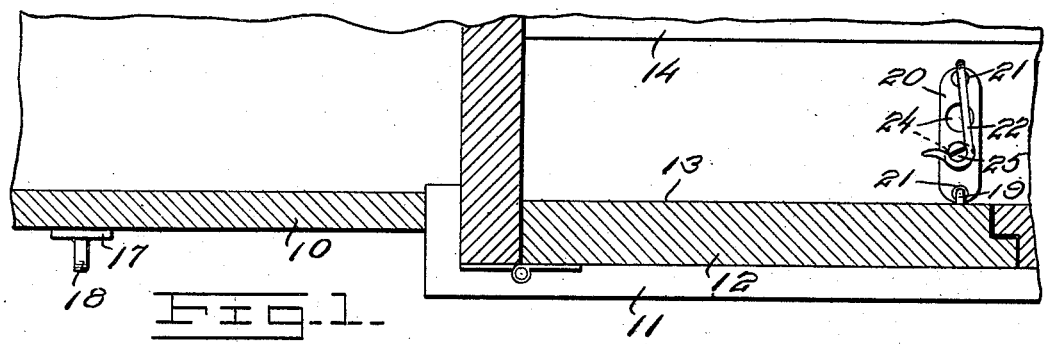
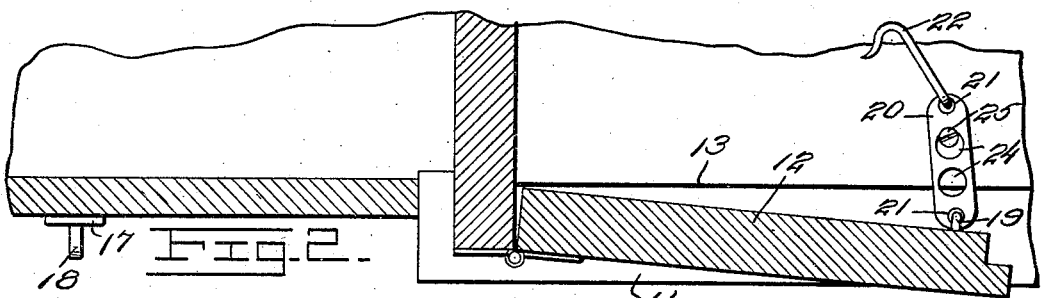
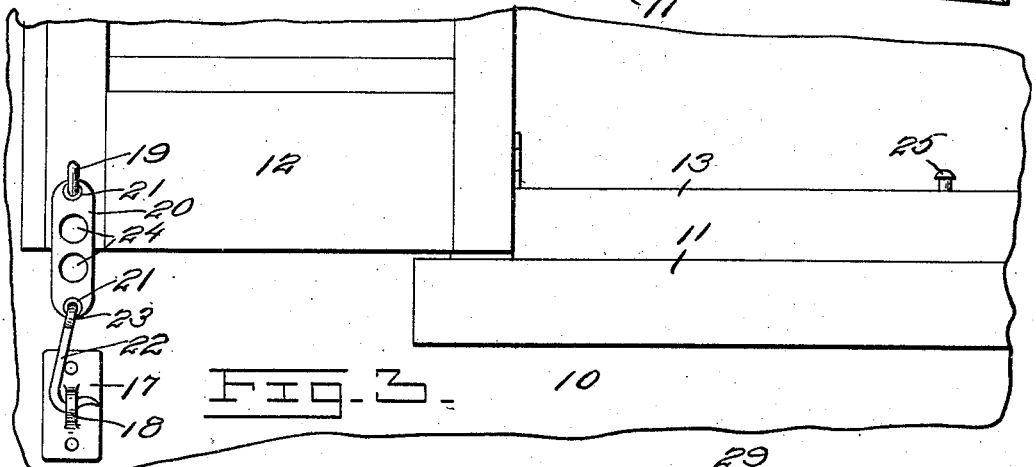
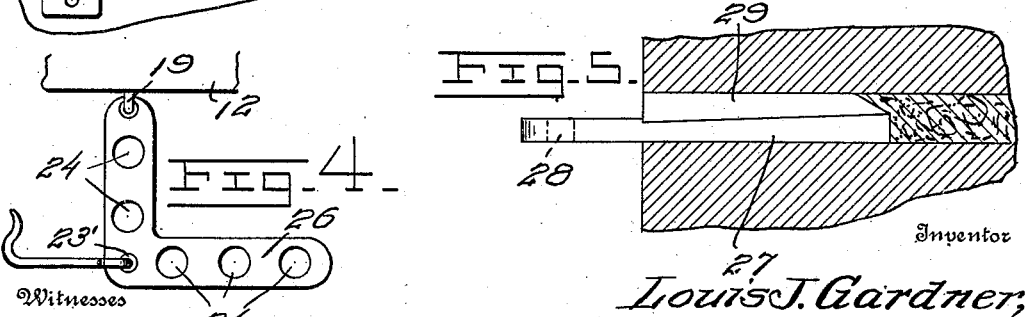
Witnesses
Inventor
Louis J. Gardner,
By Woodward & Chandler
Attorneys

UNITED STATES PATENT OFFICE.

LOUIS J. GARDNER, OF BALTIMORE, MARYLAND.

SHUTTER-BOWER.

No. 929,082.      Specification of Letters Patent.      Patented July 27, 1909.

Application filed October 27, 1908. Serial No. 459,780.

*To all whom it may concern:*

Be it known that I, LOUIS J. GARDNER, a citizen of the United States, residing at Baltimore, in the State of Maryland, have invented certain new and useful Improvements in Shutter-Bowers, of which the following is a specification.

This invention relates to builders hardware, and more particularly to shutter bowers, and has for an object to provide such a device of an especially simple and effective design, adapted to be manufactured at a very low cost from stock material.

Another object of the device is to provide a bower adapted for use to fasten a shutter in open position when desired, and which is adapted to hold a shutter adjustably bowed to various degrees.

Another object is to provide such a device adapted to secure a shutter in closed position against casual unfastening.

Another object is to provide a bower which may be readily secured to a shutter without the use of special tools and not requiring expert mechanical training for its attachment.

Other objects and advantages will be apparent from the following description and it will be understood that changes in the specific structure shown and described may be made within the scope of the claims without departing from the spirit of the invention.

In the drawings forming a portion of this specification, and in which like numerals of reference indicate similar parts in the several views, Figure 1 is a top view of the device engaged with a shutter and sill in closed position, Fig. 2 is a similar view showing the shutter bowed, Fig. 3 is a front view of a portion of a window showing the shutter secured in open position, Fig. 4 is a plan view of a modified form of link for use with this device, Fig. 5 is a horizontal sectional view of a portion of wall adjacent the window showing a modified form of eye-piece for holding the shutter open.

Referring to the drawings, there is shown a portion of a frame house front 10 having the window sill 11 and carrying a shutter 12. The sill is provided with the usual shutter bead 13 spaced inwardly of its outer edge, and a second smaller bead 14 inwardly of the first, as shown. Secured to the wall 10 laterally of and slightly below the sill, there is an ear-piece 17 comprising a rectangular plate having spaced openings therein for the reception of screws, and a central laterally projecting perforated ear 18 as shown. Secured to the shutter by means of the usual form of screw eye 19 there is an oblong plate 20 having rounded ends close to which there are formed small perforations 21 in one of which there is engaged the screw eye 19 and the other carries a hook 22 of a suitable type. The hook 22 is provided with the lateral hook arm 23 adapted to lie normally in the same plane with the plate 20 and directed inwardly at an obtuse angle, having its outer extremity bent backwardly as shown, and being adapted to engage with a projection against casual disengagement.

Formed in the plate 20 there are enlarged openings 24 spaced from each other and inwardly of the openings 21, and adapted for detachable engagement over a headed pin member 25 attached to the window sill inwardly of the bead 13 as shown, which may comprise a screw, a nail, or other suitable member. It will be seen that when the outer of the openings 24 is engaged over the member 25 the shutter will be held in bowed position, and when the inner one of the openings 24 is engaged thereover, the shutter will be held securely in closed position. The hook 22 may be turned inwardly and engaged under the head of the member 25 as shown to prevent accidental disengagement of the link therefrom, and also prevent the malicious opening of the window from the outside, as may usually be accomplished with many of the ordinary forms of window bowers and catches. To hold the window in open position, the hook 22 is engaged with the eye-piece 17, as shown in Fig. 3.

There is shown in Fig. 4 a modified form of the link member 20 in which there is provided a lateral extension 26 having an additional series of longitudinal spaced openings 24. It will be seen that by this form of the device the window may be bowed to a greater extent than with the first described form, the hook 22 being engaged in an opening 23' formed at the apex of the junction between the link 20 and the extension 26.

In Fig. 5 there is shown a modified form of eye-piece adapted for engagement with a brick wall, comprising a bar 27 having an eye 28 at its outer end and being rectangular in cross section. The bolt is thickened gradually toward its extremity opposite the eye, and is adapted to be introduced between a layer of brick outwardly of the window frame as will be understood, and secured therein by means of the wedge piece 29 having one end beveled as shown, and adapted to be driven between the layer of brick at one side of the bolt 27 as shown.

In applying the device to a window, it is preferable to locate the bolt 27 first, next disposing the eye 19 properly upon the shutter so that the hook 22 may be engaged with the bolt 27, and then locating the pin member 25 properly upon the window sill so that the inner of the openings 24 may be engaged thereover to hold the shutter in closed position, as above described.

It will be apparent that there is here provided a shutter bower and fastener of an extremely simple design, which may be manufactured at a very low cost, and which is simple to attach.

It will be understood that the first described form of the invention may be made in any size suitable for sashes of different thickness.

What is claimed is:—

1. A shutter bower comprising a multi-perforated link member, a screw eye engaged on one of the perforations and adapted for engagement with a shutter, a headed pin member adapted for engagement with a window sill for engagement through certain of the perforations, a wall piece adapted for attachment to a wall outwardly of a window and means for engagement between the link member and the wall piece to hold the shutter in open position.

2. A shutter bower comprising a multi-perforated member, a screw eye pivotally engaged therewith and adapted for engagement with a shutter, a headed pin member adapted for engagement with a window sill for loose engagement through openings in the link to hold the shutter at times in closed position and at other times in open position, a fastener carried by the link for securing said pin member in engagement with one of said openings against casual displacement to hold the shutter in closed position, a wall piece adapted for engagement with a wall outwardly of the window said fastener being adapted to engage the wall piece to hold the shutter at times in open position.

In testimony whereof I affix my signature, in presence of two witnesses.

LOUIS J. GARDNER.

Witnesses:
JACOB JANOPSKY,
JAS. D. BALACHOW.